V. A. WILLIAMS.
AUTOMOBILE SPEED LOCKING DEVICE.
APPLICATION FILED MAY 20, 1915.

1,218,028.

Patented Mar. 6, 1917.

Attest:
R. Stanton Mayer
Edgeworth Greene

Inventor:
Vincent A. Williams
by Hermann Hintz
his Atty.

UNITED STATES PATENT OFFICE.

VINCENT A. WILLIAMS, OF SAUGATUCK, CONNECTICUT.

AUTOMOBILE-SPEED-LOCKING DEVICE.

1,218,028.

Specification of Letters Patent.

Patented Mar. 6, 1917.

Application filed May 20, 1915. Serial No. 29,293.

*To all whom it may concern:*

Be it known that I, VINCENT A. WILLIAMS, a citizen of the United States, resident of Saugatuck, in the county of Fairfield, State of Connecticut, have invented certain new and useful Improvements in Automobile-Speed-Locking Devices, of which the following is a specification, reference being had to the accompanying drawings, forming a part hereof.

My invention relates to a device whereby the speed operating lever will be held at will of the operator, in a predetermined operative position, and more particularly such device is applicable in cases where at present it is necessary to maintain the foot pressure on a lever-pedal, which is not alone tiresome but trying, and in other ways disadvantageous.

More particularly I have perfected my invention for use in such cases as now well known in certain automobiles, in which the foot-pedal is pressed forward to one position for one speed, and farther for another speed, and in order to maintain the slow speed requires a constant and strong pressure on the pedal. In such a case, when it is necessary to drive the automobile at the slowest speed for a considerable time as in traffic or parade, it is tiring, and for some people most difficult to maintain the slow speed position of the lever.

A specific embodiment of my invention is shown in the accompanying drawings in which.

Figure 1:
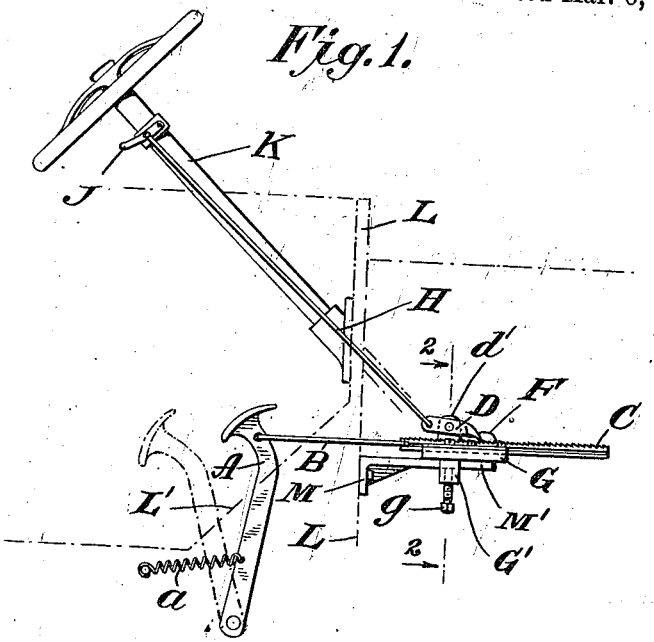
Figure 1 shows an elevation of one embodiment of my invention.

In the drawings, A is the change speed lever, *a* is a retracting spring, B is a link rod connecting the lever to the rack-bar C, D is a pawl, *d* is the pawl pivot, F is the pawl spring, G is the rack guide, H is the pawl control rod, J is the pawl operating handle.

K is the steering post, L is the dash, M is a bracket with bracket arm M' passing through the guide clamp G', with clamp bolt *g*.

It will be seen that the operating pedal-lever is in the position usual in an automobile, so that with foot pressure it may be pressed to the extent necessary to effect the changes of speed, or otherwise. The link B pinned to the lever A extends through the foot bar L', at the bottom of the dash L, and connects with the locking mechanism in front of the dash, and therefore within the hood and in a position where it is not in the way and where nothing can catch on the different parts, or particularly the pawl and rack. If any similar mechanism were put adjacent to the lever it would be in a position where coats or skirts would be apt to catch, and it would prove generally inconvenient. However, by my invention the mechanism is readily brought into position where it is a solid support, and the control is in the best position to permit a direct operating rod as H, to be run up along side the steering pillar K, thereby bringing the operating handle in the most convenient position for the operator of the vehicle. As fully shown in the drawing, the steering pillar and wheel, the speed control lever, and their mounting and location with respect to the dash and other parts of the vehicle, are normal, that is, without change, but represent standard construction in automobiles. The only additions are the means located inside of the hood with the rods or links B and H projecting through the dash and foot-board. Thus my mechanism presents a unit to be attached to standard construction and to improve the means of operation of standard construction under certain conditions used,— without any change of the existing standard parts.

When the speed changing lever A is pressed to the extreme where it would otherwise be difficult to hold it, the operator of the vehicle pulls up the hand lever J, which by means of the rod H tilts the pawl D so that the claw of the pawl engages the teeth of the rack bar C. These teeth must be made fine, that is, a large number to the inch, so that the pawl D will take hold with a very slight back-lash, in order to hold the lever A satisfactorily to prevent slipping of the speed clutch. The rack guide G being clamped by G' to the bracket arm M', while the bracket M is rigidly supported on a suitable part of the vehicle, insures rigidity of the locking of the pawl and rack with respect to the pivot of the operating lever A on the chassis, making a most effective hold for the lever in the set position.

When driving a car, as in a parade, or otherwise, when slow speed must be maintained for a long period, it has been found that it cramps the foot and leg, and the holding of the lever becomes difficult, and with some people almost impossible. Besides this, the strain causes a variation in the pressure, resulting in occasional slipping, and with the slipping of the speed mechanism overheating or other troubles ensue.

Figure 2:
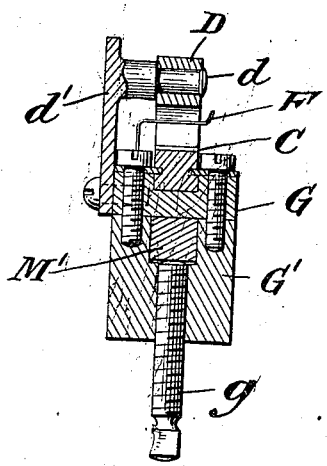
Fig. 2 is a section at 2—2 of Fig. 1.

The form I have used, as shown in Fig. 1, embodying the straight rack bar C, results in a direct pull substantially in the same line of direction at all positions of the lever, and the arrangement and proportion of parts is found to be a very effective and satisfactory device for the purpose. As is seen in Fig. 2, clamp G' has the guide-plate G secured by screws, while the pawl stud support d' is also screwed to the guide-plate G, and a small spring F which normally holds the pawl out of engagement with the rack is attached by means of one of the screws. Various changes in detail of construction may be made in this and other parts of my mechanism, without departing from the spirit of my invention.

Figure 3:
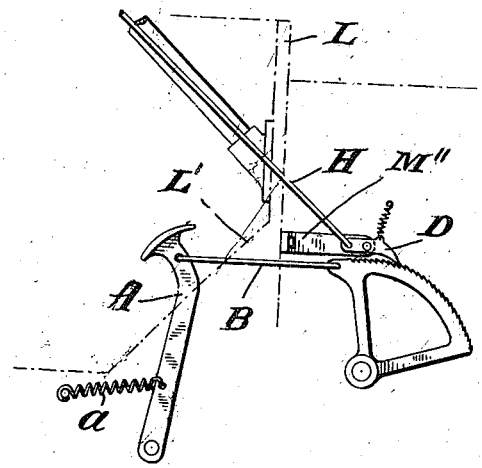
Fig. 3 is a modified form.

In Fig. 3, the segmental rack may be stamped out of metal for cheap production, while the pawl support M'' is rigidly attached to the dash L, thereby forming a secure anchorage for the pawl to hold the rack and rod B, and lever in set position.

While the forms of my invention shown and specifically described may be varied, their peculiar advantages for the purpose stated will now be apparent in view of the above description.

What I claim as my invention and desire to secure by Letters Patent is:

1. In an automobile, an accessory for improving the control, comprising a mechanism attachable to standard construction without modification, consisting of a bracket supported inside and protected by the hood and dash, a ratchet and pawl supported on said bracket, links extending from said ratchet and pawl, the one attached to the speed control lever and the other supported on the steering pillar and having an operating lever, for the purpose described.

2. In an automobile, a supplementary speed control mechanism adapted to be attached to otherwise complete and standard construction, comprising pawl and ratchet mechanism, adjustable means for connecting the same to a support, and a support, all of said mechanism being inclosed within a protected part of said vehicle structure, links connecting said pawl and ratchet to parts outside of said protected mechanism, the one attached to the speed control lever and the other being secured to the steering pillar, and a lever for operating the latter, for the purpose described.

3. In an automobile, adjunct mechanism for supplementing the normal speed control lever, comprising a locking bar and a locking member, means for automatically disengaging the same, and a support therefor, all attached within a protecting inclosure, means extending from said mechanism through the dash and adjacent parts of a standard construction and connecting said mechanism respectively to the speed control lever and to a part in proximity to the steering wheel, and means on the latter member to cause actuation of said locking bar mechanism against the automatic release mechanism, for the purpose described.

In testimony whereof, I have signed my name to this specification, in the presence of two subscribing witnesses, this 19th day of May, 1915.

VINCENT A. WILLIAMS.

Witnesses:
DANIEL J. GUINAN,
H. MUCHMORE.